(12) United States Patent
Eisinger et al.

(10) Patent No.: US 9,039,811 B2
(45) Date of Patent: May 26, 2015

(54) APPARATUS AND METHODS FOR SEPARATING VOLATILES FROM PARTICULATES

(75) Inventors: Ronald S. Eisinger, Charleston, WV (US); Bruce S. Holden, Midland, MI (US); Timothy Charles Frank, Midland, MI (US)

(73) Assignee: Univation Technologies, LLC, Houston, TX (US)

(*) Notice: Subject to any disclaimer, the term of this patent is extended or adjusted under 35 U.S.C. 154(b) by 250 days.

(21) Appl. No.: 13/578,283

(22) PCT Filed: Nov. 22, 2010

(86) PCT No.: PCT/US2010/057603
§ 371 (c)(1),
(2), (4) Date: Aug. 10, 2012

(87) PCT Pub. No.: WO2011/106047
PCT Pub. Date: Sep. 1, 2011

(65) Prior Publication Data
US 2012/0311884 A1 Dec. 13, 2012

Related U.S. Application Data

(60) Provisional application No. 61/307,556, filed on Feb. 24, 2010.

(51) Int. Cl.
*B01D 45/12* (2006.01)
*B01J 8/00* (2006.01)
(Continued)

(52) U.S. Cl.
CPC ........... *B01J 8/005* (2013.01); *B01D 2257/504* (2013.01); *B01D 17/0205* (2013.01);
(Continued)

(58) Field of Classification Search
CPC .............. B01D 2257/504; B01D 2253/102; B01D 53/02; B01D 53/04; C07C 21/073
USPC .................. 95/271, 107, 108, 110, 111, 148; 96/150; 55/424, 425, 426; 261/121.1
See application file for complete search history.

(56) References Cited

U.S. PATENT DOCUMENTS 2,054,441 A 12/1935 Peebles
4,252,968 A * 2/1981 Govoni et al. ................ 528/483
(Continued)

FOREIGN PATENT DOCUMENTS

DE 3324857 A1 1/1985
EP 0513816 A2 11/1992
(Continued)

OTHER PUBLICATIONS

Eisinger, R.S. et al., "Effect of Initial Gas Distribution on Purging Effectiveness," CRI Report PLSC 2005-004, Aug. 19, 2005. pp. 1-16.

*Primary Examiner* — Dung H Bui
(74) *Attorney, Agent, or Firm* — Kristina Leavitt

(57) ABSTRACT

Apparatus and methods for separating volatiles from particulates are provided. The apparatus includes a separator having an internal volume and a fluid discharge outlet, a particulate discharge outlet, a particulate inlet, and a fluid inlet disposed on the separator and in fluid communication with the internal volume. The particulate inlet is disposed toward a first end of the separator and the fluid inlet is disposed toward a second end of the separator. The fluid inlet includes one or more openings disposed through a sidewall of the separator.

10 Claims, 6 Drawing Sheets

(51) Int. Cl.
*B01D 17/02* (2006.01)
*B01D 19/00* (2006.01)
*C08F 6/00* (2006.01)
*F26B 3/16* (2006.01)
*F26B 17/14* (2006.01)

(52) U.S. Cl.
CPC .............. *B01D19/001* (2013.01); *B01D 45/12* (2013.01); *C08F 6/005* (2013.01); *F26B 3/16* (2013.01); *F26B 17/14* (2013.01)

(56) References Cited

U.S. PATENT DOCUMENTS

| | | |
|---|---|---|
| 4,758,654 A | 7/1988 | Brod et al. |
| 5,019,994 A | 5/1991 | Rainville |
| 5,292,863 A | 3/1994 | Wang |
| 5,391,355 A | 2/1995 | Dibble et al. |
| 5,604,994 A | 2/1997 | Annen et al. |
| 5,869,008 A * | 2/1999 | Dewitz .......................... 422/144 |
| 2002/0112367 A1 | 8/2002 | Becker et al. |
| 2006/0049082 A1* | 3/2006 | Niccum et al. ................ 208/113 |
| 2009/0221788 A1* | 9/2009 | Damme ....................... 528/483 |

FOREIGN PATENT DOCUMENTS

| | | |
|---|---|---|
| EP | 1022531 A1 | 7/2000 |
| EP | 0626244 | 11/2001 |
| EP | 1832404 A1 | 9/2007 |
| GB | 2022600 | 12/1979 |
| LU | 43908 A1 | 6/1963 |

\* cited by examiner

APPARATUS AND METHODS FOR SEPARATING VOLATILES FROM PARTICULATES

CROSS REFERENCE TO RELATED APPLICATIONS

This application is a National Stage application under 35 U.S.C. §371 of International Application No. PCT/US2010/057603, filed Nov. 22, 2010, which claims the benefit of U.S. Provisional Patent Application Ser. No. 61/307,556, filed Feb. 24, 2010, the disclosures of which are incorporated by reference in their entirety.

BACKGROUND

1. Field of the Invention

The present disclosure generally relates to apparatus and methods for separating volatiles from particulates. More particularly, the present disclosure relates to apparatus and methods for separating volatile hydrocarbons from polymer particulates.

2. Description of the Related Art

In gas-phase polymerization, a gaseous stream containing one or more monomers is passed through a fluidized bed under reactive conditions in the presence of a catalyst. A polymer product is withdrawn from the reactor while fresh monomer is introduced to the reactor. Residual gaseous and/or liquid components such as unreacted hydrocarbon monomer(s) and/or diluent(s) are usually absorbed in the polymer product. These volatile, unreacted monomers and/or diluents need to be removed from the polymerized particulates. The polymer particulates are generally porous, unmelted, and range in size from about 0.1 mm to about 2.5 mm.

Typically the polymer product is introduced to a separator (often referred to as a purge bin) and contacted with a countercurrent flow of a purge gas such as nitrogen. Current purge bin designs, however, leave a substantial amount of unreacted monomer(s) and/or diluent(s) mixed with the polymerized particulates. Thus, current purge bin designs not only waste valuable monomers and/or diluents, but can lead to safety hazards because there is a danger of explosion if the concentration of the monomer(s) and/or diluent(s) becomes excessive in the presence of oxygen. Alternatively, larger purge bins are employed and/or the flow rate of purge gas is increased. Each of these approaches increases the cost and/or materials required for adequately purging the polymer product. There is a need, therefore, for improved apparatus and methods for separating volatile hydrocarbons from polymer particulates.

SUMMARY

Apparatus and methods for separating volatiles from particulates are provided. In at least one specific embodiment, the apparatus can include a separator having an internal volume and a fluid discharge outlet, a particulate discharge outlet, a particulate inlet, and a fluid inlet disposed on the separator and in fluid communication with the internal volume. The particulate inlet can be disposed toward a first end of the separator and the fluid inlet can be disposed toward a second end of the separator. The fluid inlet can include one or more openings disposed through a sidewall of the separator.

In at least one specific embodiment, the method for separating volatiles from particulates can include introducing particulates containing volatiles to an internal volume of a separator through a particulate inlet. The separator can include the internal volume and a fluid discharge outlet, a particulate discharge outlet, the particulate inlet, and a fluid inlet disposed on the separator and in fluid communication with the internal volume. The particulate inlet can be disposed toward a first end of the separator and the fluid inlet can be disposed toward a second end of the separator. The fluid inlet can include one or more openings disposed through a sidewall of the separator. The method can also include introducing a purge gas to the internal volume through the fluid inlet. The purge gas can counter-currently contact the particulates to produce a volatiles-rich purge gas and particulates having a reduced concentration of volatiles. The volatiles-rich purge gas can be recovered from the fluid discharge outlet. The particulates can be recovered from the particulate discharge outlet.

In at least one specific embodiment, the apparatus for separating volatiles from particulates can include a separator having an internal volume, a fluid discharge outlet, a particulate discharge outlet, a particulate inlet, and a fluid inlet in fluid communication with the internal volume. The particulate inlet can be disposed toward a first end of the separator. The fluid inlet can be disposed toward a second end of the separator. A fluid introduction cone can be disposed within the internal volume and located toward the second end of the separator. A base of the cone can be oriented toward the second end of the separator. The fluid introduction cone can be supported by one or more support members extending from an internal wall of the cone to the separator such that an annulus is formed between the base of the cone and the separator that is free of any structures. A conduit can fluidly connect the fluid inlet with an internal volume of the fluid introduction cone.

DETAILED DESCRIPTION

Figure 1:
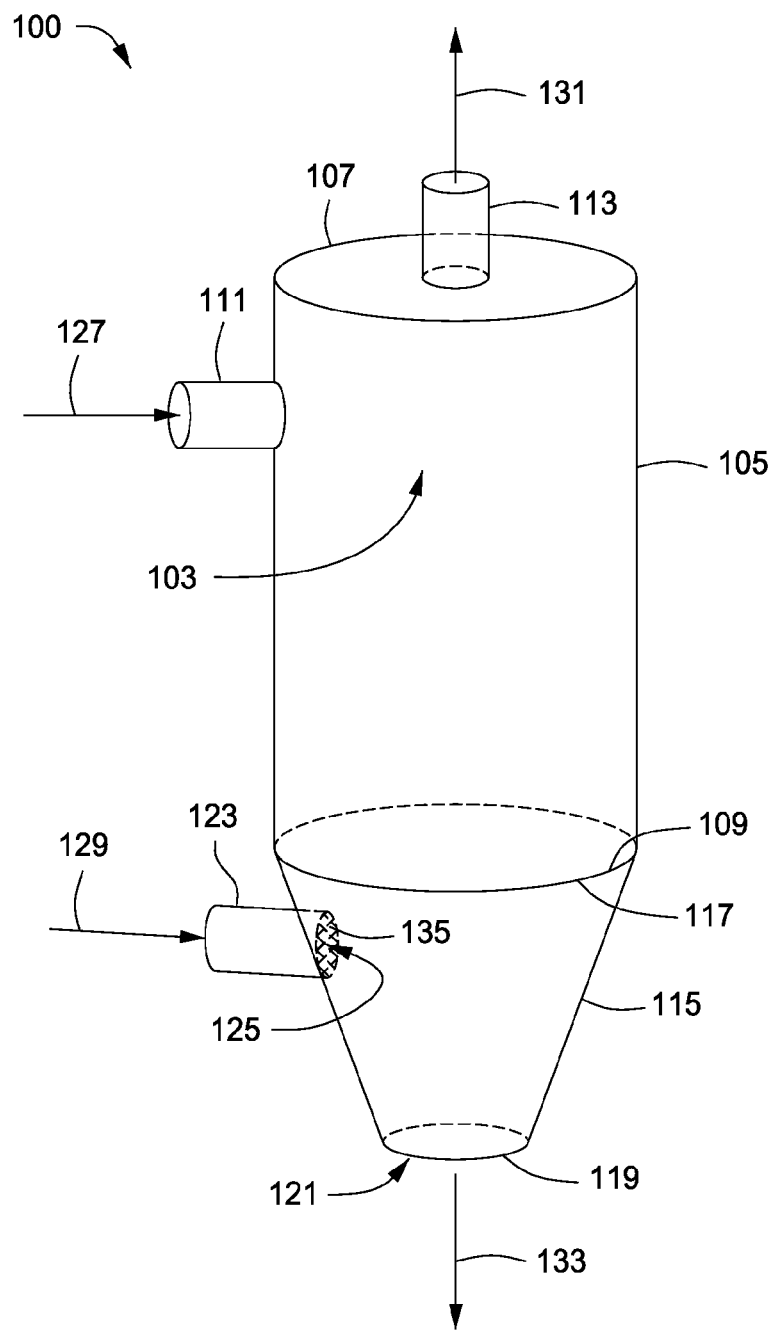
FIG. 1 depicts an isometric view of an illustrative separator having a fluid inlet for introducing a gas to an internal volume thereof.

FIG. 1 depicts an isometric view of an illustrative separator 100 having a fluid inlet 123 for introducing a gas to an internal volume 103 thereof. The separator or vessel 100 can include a first or "separation" section 105 and a second or "particulate discharge" section 115. The separation section 105 can have a first end or "top" 107, a second end or "bottom" 109, one or more particulate inlets (one is shown 111) and one or more fluid outlets (one is shown 113) in fluid communication with the internal volume 103. The one or more particulate inlets 111 can be disposed between the top end 107 and the bottom end 109, about the top end 107, or a combination thereof. The one or more fluid outlets 113 can be disposed about the top end 107, between the top end 107 and the bottom end 109, or a combination thereof. As used herein, the terms "top" and "bottom," "front" and "rear," "left" and "right," and other like terms are merely used for convenience to refer to spatial orientations or spatial relationships relative to one another with respect to the separator 100 when viewed from the direction shown in FIG. 1.

The particulate discharge section 115 can have a first end or "top" 117 and a second end or "bottom" 119. The top 117 can be connected to the bottom 109 of the separation section 105. The particulate discharge section 115 can also include one or more particulate outlets (one is shown 121) and one or more fluid or "purge gas" inlets (one is shown 123) in fluid communication with the internal volume 103. The one or more particulate outlets 121 can be disposed between the top 117 and the bottom 119, about the bottom 119, or a combination thereof. The one or more fluid inlets 123 can be disposed between the top 117 and the bottom 119, about the bottom 119, or a combination thereof. In at least one specific embodiment, at least one of the one or more fluid inlets 123 can be disposed about the separator 100 at the junction or connection between the separation section 105 and the particulate discharge section 115. In at least one other specific embodiment, at least one of the one or more fluid inlets 123 can be disposed between the one or more particulate inlets 111 and the bottom 109 of the separation section 105.

Particulates via line 127 and a fluid or "purge gas" via line 129 can be introduced to the internal volume 103 of the separator 100. The particulates can flow toward the particulate outlet 121 and the purge gas can flow toward the fluid outlet 113. As such, the particulates and the purge gas can flow counter-current one another within the internal volume 103. The purge gas and the particulates can contact one another and the purge gas can separate or "strip" at least a portion of any volatiles in or on the particulates therefrom. The purge gas and the separated volatiles can be recovered from the fluid outlet via line 131. Particulates having a reduced concentration of volatiles relative to the particulates in line 127 can be recovered from the particulate outlet 121 via line 133.

In one or more embodiments, the particulates can flow toward the particulate outlet 121 in a substantially mass-flow manner. As used herein, the term "mass-flow" refers to the flow of the particulates throughout a cross-section of the separator 100 such that all of the particulates are in motion. In at least one specific embodiment, the particulates can flow toward the particulate outlet 121 in a substantially plug-flow manner.

It has been surprisingly and unexpectedly discovered that simply introducing the purge gas via line 129 to the internal volume 103 via the one or more fluid inlets 123, without attempting to uniformly or evenly distribute the flow of the gas thereto, significantly increases the amount of volatile components that can be separated from the particulates introduced via line 127. It has also been surprisingly and unexpectedly discovered that a separator free of or substantially free of gas-conducting structures within the internal volume 103 can significantly increase the separation of volatile components from the particulates. Not wishing to be bound by theory, it is believed that the uniformity of initial purge gas distribution within the internal volume is not a dominant factor in the amount of volatiles that is separated from the particulates introduced via line 127. Rather, it is believed that the more important factor is the absence of internal, gas-conducting structures within the internal volume 103, and more particularly, the absence of internal, gas-conducting structures between the top of a particulate bed within the separator 100 and the location at which the purge gas in line 129 is introduced through inlet(s) 123 that leads to a substantial increase in the separation efficiency of the separator 100.

As used herein, the term "gas-conducting structures" refers to objects such as support beams, pipes, and internal walls whose surfaces provide a more attractive venue for the flow of purge gas. A more attractive venue for the flow of purge gas through the particulate bed within the internal volume can occur when the void volume fraction (i.e. porosity) in the particulate bed adjacent or proximate to such surfaces is increased locally at these surfaces, thereby attracting a larger or increased flow of the purge gas. If the purge gas is conducted along the surfaces of gas-conducting structures, less purge gas is available for the removal of volatiles from the particulates in other locations within the particulate bed. Illustrative examples of gas-conducting structures can include, but are not limited to, pipes, support beams, and wall surfaces that are sloped inward toward the fluidized bed, i.e. in a conical portion of the bed where the diameter is decreasing with increase height.

Accordingly, the one or more fluid inlets 123 can be or include one or more opening or ports 125 disposed through a wall of the particulate discharge section 115 and flush with an inner surface thereof. The internal volume 103 can also be free or substantially free of any gas-conducting structures disposed between the top of the particulate bed and the location(s) at which the purge gas in line 129 is introduced via inlet 111 to the internal volume 103. For example, the internal volume 103 can be void of projections or protrusions extending from the walls and into the internal volume 103, support beams, piping, and the like.

While the outer surface of an inverted cone may or may not act as a gas-conducting structure, the horizontal beams usually employed to support the inverted cone can act as a gas-conducting structure. Nevertheless, an inverted cone can sometimes be justified for increasing purging effectiveness because it can improve the mass-flow of the particulates through the internal volume 103. In one or more embodiments, a cone (not shown) can be disposed within the internal volume 103 between the particulate inlet 111 and the opening 125. A base of the cone can be oriented toward the bottom 119 of the particulate discharge section 119. The cone can be centrally disposed within the internal volume 103 such than an annulus is formed between the cone and the inner surface or inner wall of the separator 100. The annulus can be free or substantially free of any gas-conducting structures. In at least one specific embodiment, a part from a cone, the internal volume can be free or substantially free of any gas-conducting structures between the opening 125 and a top of a particulate bed (not shown) disposed within the internal volume 103.

The cross-sectional shape of the one or more fluid inlets 123 and the one or more openings 125 can be any suitable geometrical shape. If the separator 100 includes a plurality of fluid inlets 123, the cross-sectional shape of any two of the fluid inlets 123 and the openings 125 associated therewith can be the same or different with respect to one another. Illustrative cross-sectional shapes can include, but are not limited to, circular, oval, elliptical, triangular, rectangular, any other polygon having three or more sides, any other shape having curved sides or any other geometrical shape having any combination of curved and straight sides.

In one or more embodiments, the opening 125, fluid inlet 123, or a combination thereof, can include one or more screens, sintered filters, sintered laminate filters, rain caps, bubble caps, sieve caps, baffles, or other particulate-restricting devices 135 that can reduce or prevent particulates from flowing from the internal volume 103 and into the fluid inlet 123. For example, a screen 135 having any desired mesh size can be located or otherwise disposed within or about the opening 125. Depending on the size of the particulates in line 127, a screen 135 can have a U.S. Sieve designation ranging from a low of about No. 4, about No. 10, about No. 18, or about No. 35 to a high of about No. 100, about No. 200, about No. 325, or about No. 400. In one or more embodiments, the fluid outlet 113 can include one or more screens, sintered filters, sintered laminate filters, rain caps, bubble caps, sieve caps, baffles or other particulate-restricting 135 similar to the opening 125 and/or fluid inlet 123.

Any number of fluid inlets 123 can be in fluid communication with the internal volume 103. For example, the separator 100 can include from 1 to 100 or more fluid inlets 123 disposed through a wall of the particulate discharge section 115, a wall of the separation section 105, or a combination thereof. In another example, the separator 100 can include fluid inlets 123 ranging from a low of about 1, about 5, or about 10 to a high of about 40, about 60, or about 80. In at least one specific embodiment, the separator 100 can include two or more fluid inlets 123 that can be disposed about the separator 100 at approximately the same elevation or location between the top 107 of the separation section 105 and the second end 119 of the particulate discharge section 115. For example, four fluid inlets 123 can be disposed between the top 117 and the bottom 119 of the particulate discharge section 115 at approximately the same elevation with each fluid inlet 123 disposed approximately 90° with respect to one another. In another example, two fluid inlets 123 can be disposed between the top 117 and the bottom 119 at approximately the same elevation with the two inlets 123 disposed on opposing sides of the particulate discharge section 115. In still another example, two fluid inlets 123 can be disposed between the top 117 and the bottom 119 at approximately the same elevation with the two inlets 123 disposed on the same side of the particulate discharge section 115.

The separator 100, e.g. the separation section 105, particulate discharge section 115, particulate inlet 111, fluid outlet 113, fluid inlet 123, and/or the particulate outlet 121, can be made from any material or combination of materials having suitable rigidity, strength, and other desirable properties. Illustrative materials can include, but are not limited to, metals, metal alloys, polymers or plastics, glasses, fiberglass, or any combination thereof. Preferably the separator 100 is made from one or more metal or metal alloys such as steel, stainless steel, carbon steel, nickel alloys, and the like.

The cross-sectional shapes of the separation and particulate discharge sections 105, 115 can be any suitable geometrical shape. The cross-sectional shapes of the separation section 105 and the particulate discharge section 115 can be the same or different. Illustrative cross-sectional shapes can include, but are not limited to, circular, oval, elliptical, triangular, rectangular, any other polygon having three or more sides, any other shape having curved sides or any other geometrical shape having any combination of curved and straight sides.

The separation section 105 and/or the particulate discharge section 115 can have constant or variable cross-sections. For example, the cross-section of the separation section 105 can be circular having a constant diameter from the top 107 to the bottom 109 to provide a cylindrical separation section 105 and the cross-section of the particulate discharge section 115 can be circular having a variable diameter from the top 117 to the bottom 119 to provide a conical or frustoconical particulate discharge section 115. In another example, the cross-section of the separation section 105 can be circular having a variable diameter from the top 107 to the bottom 109 to provide a conical or frustoconical separation section 107 and the cross-section of the particulate discharge section 115 can be circular having a variable diameter from the top 117 to the bottom 119 to provide two conical or frustoconical sections opposed to one another. In yet another embodiment, the cross section of the separation section 105 and the particulate discharge section 115 can both be circular with the separation section 105 and the particulate discharge section 115 having the same diameters or different diameters.

In one or more embodiments, the angle or slope of a conical or frustoconical particulate discharge section 115 can range from about 50° to about 80°, with respect to a base of the conical or frustoconical particulate discharge section 115. For example, the angle or slope of a conical or frustoconical particulate discharge section 115 can be about 55°, about 60°, about 65°, about 68°, about 70°, about 72°, or about 75°, with respect to a base of the conical or frustoconical particulate discharge section 115. Preferably, a conical or frustoconical particulate discharge section 115 has an angle of about 60°, more preferably about 65°, and even more preferably from about 68° to about 72°, with respect to a base of the conical or frustoconical particulate discharge section 115.

In one or more embodiments, the inner surface of the separation section 105, the particulate discharge section 115, or both can be coated with one or more slick or low friction coatings. Illustrative coating material can be or include, for example, polytetrafluoroethylene. Commercially available coating material can include PLASITE® 7122, which is available from CARBOLINE® Company.

The particulate outlet 121 can have any desired cross-sectional shape. The particulate outlet 121 can have any desired cross-sectional area. For example, in at least one specific embodiment, the ratio of the cross-sectional area of the particulate outlet 121 to the cross-sectional area of the separation section 105 can be about 1:1, about 1:1.5, about 1:2, about 1:2.5, about 1:3, about 1:3.5, about 1:4, about 1:4.5, about 1:5, about 1:5.5, about 1:6, about 1:6.5, about 1:7, about 1:7.5, about 1:8, about 1:8.5, about 1:9, about 1:9.5, or about 1:10.

In one or more embodiments, a discharge regulating device, such as a valve, can be disposed on, in, or otherwise be in communication with the particulate outlet 121 to regulate or control the rate at which the particulates are recovered from the separator 100. Illustrative discharge regulating devices can include, but are not limited to, rotary airlock valves, table feeders, circle feeders, slide valves, and the like.

The dimensions of the separator 100, e.g. the separation section 105, particulate discharge section 115, inlets 111, 123, and outlets 113, 121 and the number of inlets 111, 123 and outlets 113, 131 can be based, at least in part, on the particular components of the particulates, the rate aw which particulates are introduced via line 127, and/or the amount of volatiles desired to be separated from the particulates. For example, the separator 100 can be constructed to provide an internal volume 103 capable of receiving from about 1 kg/hr to about 75,000 kg/hr or more of the particulates via line 127. In another example, the separator 100 can be constructed to provide an internal volume capable of receiving from a low of about 10 kg/hr, about 1,000 kg/hr, or about 10,000 kg/hr to a high of about 30,000 kg/hr, about 40,000 kg/hr, or about 50,000 kg/hr of the particulates via line 127.

The particulates can include any particulate material or combination of particulate materials. In one example, the particulates can be or include a polymer product recovered from a polymerization reactor (not shown) that can include formed polymer particles or particulates, one or more absorbed gaseous and/or liquid monomers, one or more absorbed gaseous and/or liquid diluents, and catalyst and/or cocatalyst components used to form the polymer particulates. Polymer particulates can include homopolymers, copolymers, terpolymers, or combinations thereof. Preferred polymers include homopolymers or copolymers of $C_2$ to $C_{40}$ olefins, preferably $C_2$ to $C_{20}$ olefins, preferably a copolymer of an alpha-olefin and another olefin or alpha-olefin. The polymer particulates can include ethylene or propylene copolymerized with one or more comonomers such as propylene, 1-butene, 1-pentene, 1-hexene, 1-heptene, 1-octene, 4-methylpent-1-ene, 1-decene, 1-dodecene, 1-hexadecene and the like. Preferably, the polymer particulates can include homopolyethylene, homopolypropylene, propylene copolymerized with ethylene and/or 1-butene, ethylene copolymerized with propylene, 1-butene, and/or 1-hexene, and/or optional dienes. Preferred examples of polymer particulates include ultra low density polyethylene ("ULDPE"), very low density polyethylene ("VLDPE"), linear low density polyethylene ("LLDPE"), low density polyethylene ("LDPE"), medium density polyethylene ("MDPE"), high density polyethylene ("HDPE"), polypropylene, isotactic polypropylene, highly isotactic polypropylene, syndiotactic polypropylene, random copolymer of propylene and ethylene and/or 1-butene and/or 1-hexene, elastomers such as ethylene propylene rubber, ethylene propylene diene monomer rubber, neoprene, and blends of thermoplastic polymers and elastomers, such as for example, thermoplastic elastomers and rubber toughened plastics. The absorbed diluents can include unreacted monomers, comonomers, diluents, and any combination thereof. Illustrative diluents can include, but are not limited to, propane, butane, isobutane, pentane, isopentane, hexane, isomers thereof, derivatives thereof, and combinations thereof.

Particulates via line 127 that include a polymer product having formed polymer particulates and one or more gaseous and/or liquid hydrocarbons can have any amount or concentration of the gaseous and/or liquid hydrocarbon component. For example, the amount of the gaseous and/or liquid hydrocarbons in the polymer product in line 127 can range from a low of about 1 ppmw, about 100 ppmw, or about 1,000 ppmw to a high of about 3 wt %, about 5 wt %, or about 10 wt %. In another example, the amount of the gaseous and/or liquid hydrocarbons in the polymer product in line 127 can range from about 0.5 wt % to about 7 wt %, about 1 wt % to about 5.5 wt %, or about 1.5 wt % to about 4.5 wt %. In yet another example, the amount of the gaseous and/or liquid hydrocarbons in the polymer product in line 127 can range from a low of about 4,000 ppmw, about 4,500 ppmw, or about 5,000 ppmw to a high of about 6,500 ppmw, about 10,000 ppmw, or about 20,000 ppmw.

The fluid or "purge gas" via line 129 can include any fluid or combination of fluids suitable for purging, i.e. separating, at least a portion of the volatiles in the particulates to produce the particulates via line 133 having a reduced concentration of volatiles relative to the particulates in line 127. Illustrative fluids can include, but are not limited to, nitrogen, argon, carbon monoxide, carbon dioxide, water, hydrocarbons, or any combination thereof. Depending on the particular particulates, suitable fluids via line 129 can also be or include oxygen or air. In one or more embodiments, the fluid via line 129 can include one or more fluorinated hydrocarbons. Suitable fluorinated hydrocarbons can be as discussed and described in U.S. Patent Application Publication No. 2009/0118466. In at least one specific embodiment, the fluid via line 129 can include about 90 vol % or more nitrogen, about 95 vol % or more nitrogen, about 98 vol % or more nitrogen, or about 99 vol % or more nitrogen. In at least one other specific embodiment, the fluid via line 129 can include a nitrogen/steam mixture. The amount of steam in the nitrogen/steam mixture can range from a low of about 0.001 vol %, about 0.01 vol %, or about 0.015 vol % to a high of about 1 vol %, about 5 vol %, about 10 vol %, about 15 vol %, or about 20 vol %. For example, the amount of steam in the nitrogen/steam mixture can range from about 0.5 vol % to about 4 vol %, about 1.2 vol % to about 1.6 vol %, or about 1 vol % to about 2 vol %.

The amount of volatiles separated and recovered via line 131 from the particulates introduced via line 127 can be about 90% or more, about 95% or more, about 99% or more, about 99.9% or more, about 99.99% or more, about 99.995% or more, or about 99.999% or more. In other words, the particulates exiting via line 133 can contain less than about 10%, less than about 5%, less than about 1%, less than about 0.1%, less than about 0.01%, less than about 0.005%, or less than about 0.001% of the volatiles present in the particulates.

The separator 100 can be operated at a temperature less than ambient temperature, equal to ambient temperature, or greater than ambient temperature. For example, if the particulates include one or more formed polymer particulates a desirable temperature can include a temperature ranging from about 20° C. to a temperature slightly below a melting point for the particular polymer particulates. In at least one specific embodiment, the separator 100 can be operated at a temperature ranging from a low of about 25° C., about 40° C., or about 60° C. to a high of about 90° C., about 110° C., or about 120° C. For example, the separator 100 can be operated at a temperature ranging from about 65° C. to about 95° C., about 70° C. to about 85° C., or about 55° C. to about 80° C.

The separator 100 can be operated at a pressure less than atmospheric pressure, equal to atmospheric pressure, or greater than atmospheric pressure. Preferably the separator 100 is operated at a positive pressure, i.e. greater than atmospheric pressure. For example, the separator 100 can be operated at a pressure ranging from a low of about 0.1 kPa, about 0.5 kPa, or about 1 kPa to a high of about 1,000 kPa, about 2,000 kPa, or about 3,000 kPa above atmospheric pressure. In at least one specific embodiment, the separator 100 can be operated at a pressure ranging from a low of about 50 Pa, about 150 Pa, or about 300 Pa to a high of about 700 Pa, about 1,000 Pa, or about 2,500 Pa above atmospheric pressure.

The particular residence time of the particulates introduced via line 127 within the separator 100 can depend on one or more factors. For example the particular residence time of the particulates can depend at least in part on the particular volatile fluids absorbed on or in the particulates, the size of the particulates, the type of particulates, e.g. type of polymer, various properties of the particulates such as crystallinity, molecular weight, and stickiness when the particulates are polymers, the temperature within the separator 100, the pressure within the separator 100, the flow rate of particulates through the separator 100, and/or the flow rate of the particular purge gas in line 129. The residence time of the particulates within the separator 100 can range from a low of about 0.1 hours, about 0.3 hours, or about 0.4 hours to a high of about 1 hour, about 2 hours, about 3 hours, about 5 hours, or about 10 hours. For example, the particulates can have a residence time within the separator 100 ranging from about 0.5 hours to about 0.7 hours, from about 0.25 hours to about 0.9 hours, or from about 0.5 hours to about 1.5 hours.

In one or more embodiments, the particulates via line 127 can be introduced to the separator 100 in a batch mode. For example, a predetermined amount of particulates via line 127 can be introduced to the separator 100 and volatiles can be separated therefrom. After separating at least a portion of the volatiles from the particulates the volatile-lean particulates can be removed and another predetermined amount of particulates via line 127 can be introduced to the separator 100. In one or more embodiments, the particulates via line 127 can be introduced to the separator 100 in a continuous mode. For example, particulates via line 127 can be continuously introduced to the separator 100 and volatile-lean particulates via particulate outlet 121 can be recovered at a sufficient rate to maintain a desired amount of particulates within the separator 100.

Figure 2:
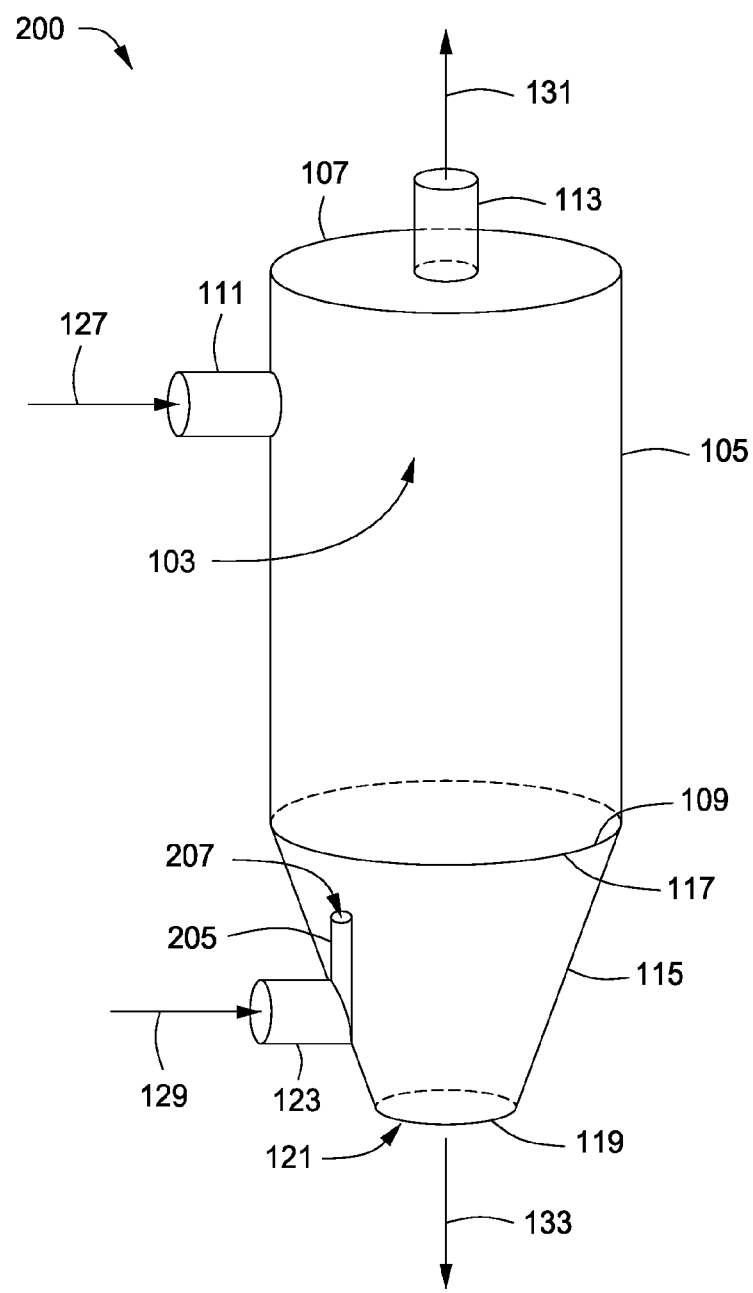
FIG. 2 depicts an isometric view of another separator having a fluid distribution conduit disposed within the internal volume of the separator.

FIG. 2 depicts an isometric view of another separator 200 having a fluid distribution conduit 205 disposed within the internal volume 103 of the separator 200. The separator 200 can be similar to the separator 100 discussed and described above with reference to FIG. 1. The separator 200 can further include the distribution conduit 205 in fluid communication with the fluid or "purge gas" inlet 123. In at least one embodiment, the distribution conduit 205 can be disposed about the opening or port 125 (see FIG. 1) disposed through the wall of the particulate discharge section 115. A first end of the distribution conduit 205 can be connected to an inner wall of the particulate discharge section 115 about the opening 125, within the fluid inlet 123, or a combination thereof. In at least one other embodiment, the distribution conduit 205 can include a conduit in fluid communication with line 129 and disposed through the opening or port 125 and connected to or otherwise sealed about an outer surface thereof to the sidewall of the particulate discharge section 115.

In at least one embodiment, the distribution conduit 205 can be parallel with a longitudinal axis of the separator 200. The distribution conduit 205 can have one or more openings or ports 207 directed toward the top 107 of the separation section 105. In other words, the one or more openings or ports 207 can be perpendicular to the longitudinal axis of the separator 200. In another embodiment, the distribution conduit 205 can be non-parallel with a longitudinal axis of the separator 200 and can have one or more openings or ports 207 directed toward the top 107 of the separation section 105. In another embodiment, a first portion of the distribution conduit 205 can be non-parallel with a longitudinal axis of the separator 200 and a second portion of the distribution conduit 205 can be parallel with the longitudinal axis of the separator 200 and the one or more openings or ports 207 can be directed toward the top 107 of the separation section 105.

The internal volume 103 can also be free or substantially free of any structure(s) disposed between the introduction of the particulates via line 127 through the particulate inlet 111 and the fluid via line 129 through the opening(s) 207. For example, the internal volume 103 can be void of projections or protrusions extending from the walls and into the internal volume 103 between the opening 207 and the particulate inlet 111. In one or more embodiments, the internal volume 103 can be free or substantially free of any structure(s) disposed between a top of a particulate bed disposed within the internal volume 103 and the opening(s) 207 through which the fluid in line 129 can be introduced to the internal volume 103. As such, internal structures can be present between the top of a particulate bed that can be present within the internal volume 103 and the particulate inlet 111.

Similar to the one or more fluid inlets 123 and the one or more openings 125, discussed and described above with reference to FIG. 1, the cross-sectional shape of the distribution conduit 205 and the one or more openings 207 can be any suitable geometrical shape. Further, if the separator 200 includes a plurality of distribution conduits 205, the cross-sectional shape of any two of the distribution conduits 205 and the openings 207 associated therewith can be the same or different with respect to one another.

The distribution conduits 205, the openings 207, or a combination thereof can include one or more screens, sintered filters, sintered laminate filters, rain caps, bubble caps, sieve caps, baffles, or other particulate-restricting devices 135 (see FIG. 1) that can reduce or prevent particulates from flowing from the internal volume 103 and into the distribution conduits 205.

Figure 3:
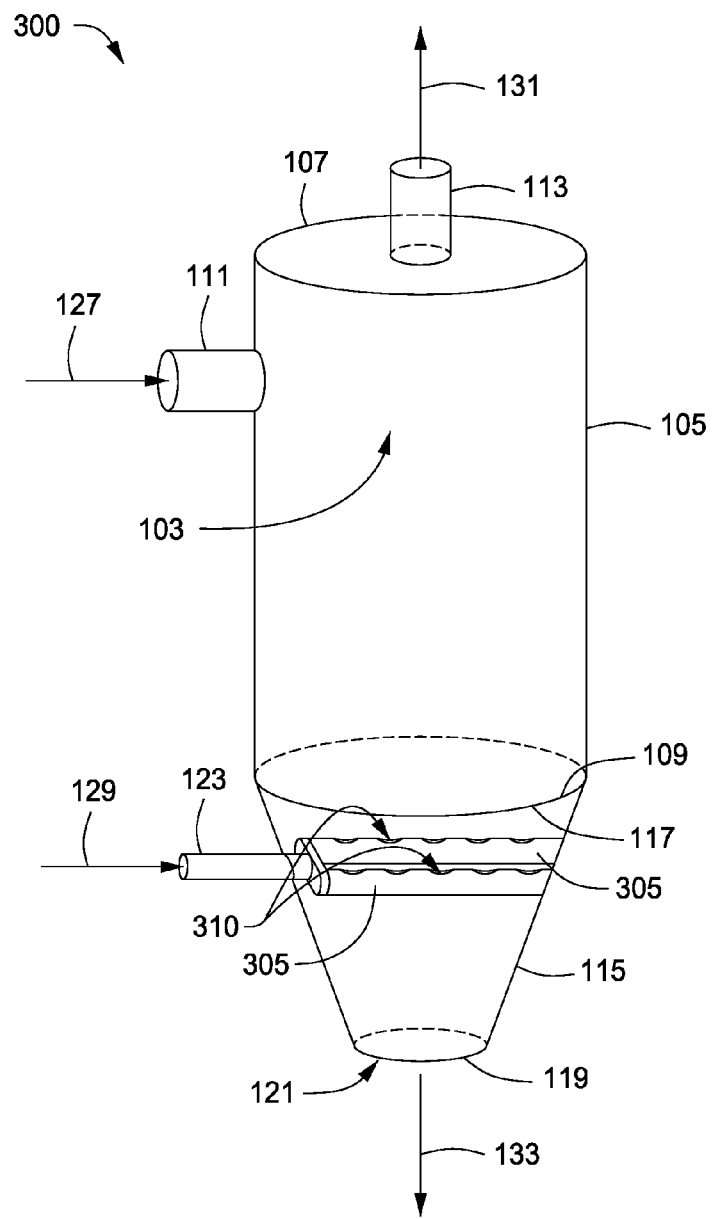
FIG. 3 depicts an isometric view of another illustrative separator having a plurality of fluid distribution conduits disposed within the internal volume of the separator.

FIG. 3 depicts an isometric view of another illustrative separator 300 having a plurality of fluid distribution conduits 305 disposed within the internal volume 103 of the separator 300. The separator 300 can be similar to the separators 100 and/or 200 discussed and described above with reference to FIGS. 1 and 2. The separator 300 can further include one or more fluid distribution conduits (two are shown) 305 disposed within the internal volume 103 of the separator 300. While two fluid distribution conduits 305 are shown, any number of fluid distribution conduits 305 can be disposed within the internal volume 103, for example 1, 3, 5, or fluid distribution conduits 305 can be disposed within the internal volume 103.

The distribution conduits 305 can be perpendicular with respect to a longitudinal axis of the separator 300. For example, in a vertically oriented separator 300 the distribution conduits 305 can be horizontal. If two or more distribution conduits 305 are disposed within the internal volume 103, the two or more distribution conduits 305 can be parallel and/or planar with respect to one another.

The fluid distribution conduits 305 can include one or more openings or ports 310 disposed through a sidewall of the distribution conduit(s) 305. The openings or ports 310 can be oriented toward the top 107 of the separation section 105. In other words, the openings or ports 310 can be perpendicular to the longitudinal axis of the separator 200 and can face toward the top 107.

For a fluid distribution conduit 305 having a plurality of openings or ports 310, the openings 310 can be disposed along at least a portion of a length of the distribution conduit 305. Any two openings 310 can be located any desired distance from one another. The distance between any two sets of openings 310 can be the same or different. For a fluid distribution conduit 305 having a circular cross-section, the openings 310 are preferably disposed through the portion of the side wall of the fluid distribution conduits 305 that is closest to the top 107. Disposing the openings 310 at a location about the fluid distribution conduits 305 that is closest to the top 107 reduces or eliminates the portion of the fluid distribution conduit 305 that is located between the openings 310 and particulate inlet 111. Similarly, disposing the openings 310 at a location about the fluid distribution conduits 305 that is closest to the top 107 reduces or eliminates the portion of the fluid distribution conduit 305 that is located between the openings 310 and a top of a fluidized bed that can be disposed within the internal volume 103.

Similar to the one or more fluid inlets 123 and the one or more openings 125, discussed and described above with reference to FIG. 1, the cross-sectional shape of the distribution conduit(s) 305 and the one or more openings 310 can be any suitable geometrical shape. Further, if the separator 300 includes a plurality of distribution conduits 305, the cross-sectional shape of any two of the distribution conduits 305 and the openings 310 associated therewith can be the same or different with respect to one another. The cross-sectional shape of any two openings 310 disposed through a sidewall of any particular distribution conduit 305 can be the same or different.

The distribution conduits 305, the openings 310, or a combination thereof can include one or more screens, sintered filters, sintered laminate filters, rain caps, bubble caps, sieve caps, baffles, or other particulate-restricting devices 135 (see FIG. 1) that can reduce or prevent particulates from flowing from the internal volume 103 and into the distribution conduits 305.

The internal volume 103 can be free or substantially free of any structures between the particulate inlet 111 and the openings 310. For example, the internal volume 103 can be void of projections or protrusions extending from the walls and into the internal volume 103 between the opening(s) 310 and the particulate inlet 111. In one or more embodiments, the internal volume 103 can be free or substantially free of any structure(s) disposed between a top of a particulate bed disposed within the internal volume 103 and the opening(s) 310 through which the fluid in line 129 can be introduced to the internal volume 103. As such, internal structures can be present between the top of a particulate bed that can be present within the internal volume 103 and the particulate inlet 111.

Figure 4:
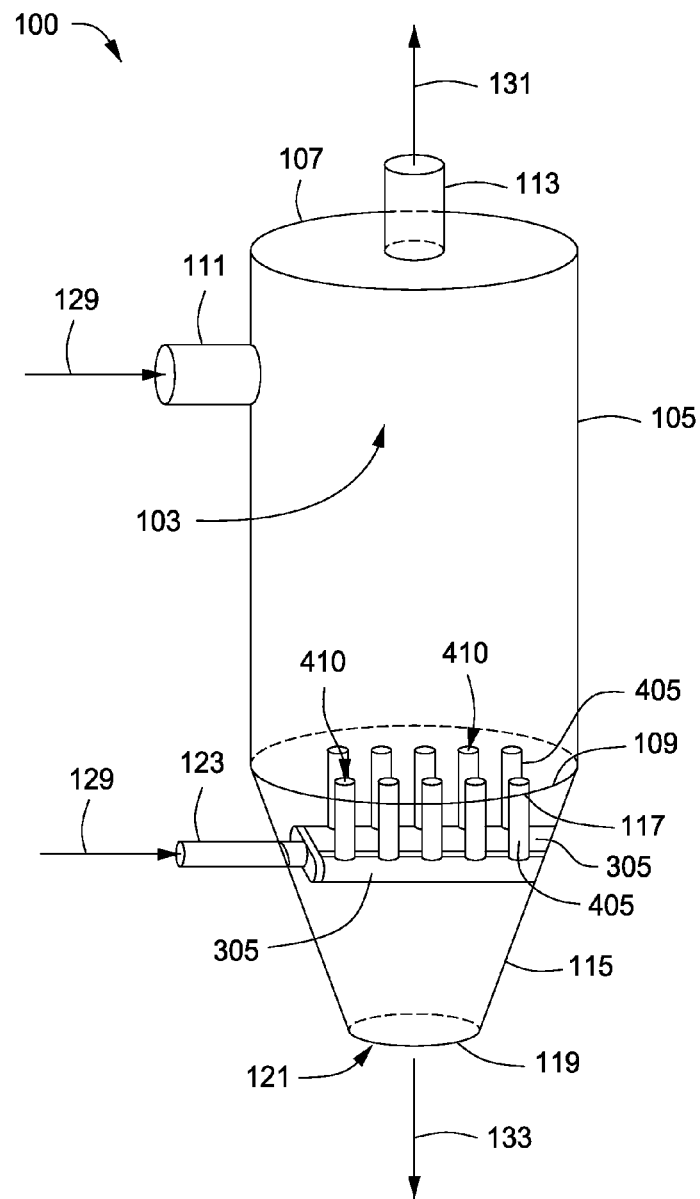
FIG. 4 depicts an isometric view of an illustrative separator with a plurality of fluid distribution conduits having nozzles extending therefrom disposed within the internal volume of the separator.

FIG. 4 depicts an isometric view of yet another illustrative separator 400 with a plurality of fluid distribution conduits 305 having nozzles 405 extending therefrom disposed within the internal volume 103 of the separator 400. The separator 400 can be similar to the separators 100, 200, and/or 300 discussed and described above with reference to FIGS. 1-3. The fluid distribution conduits 305 can be as similar as discussed and described above with reference to FIG. 3. As depicted in FIG. 4, the fluid distribution conduits 305 can further include one or more nozzles 405 fluidly connected to at least one of the one or more of the openings 310 (see FIG. 3) of the fluid distribution conduits 305.

The nozzles 405 can include an opening or port 410 at a distal end thereof for introducing the fluid via line 129 to the internal volume 103. The openings 410 of the nozzles 405 can be directed toward the top 107 of the separator 400. The openings 410 can be perpendicular with respect to a longitudinal axis of the separator 400. For example, in a vertically oriented separator 400 the openings 410 can be horizontal.

If a plurality of nozzles 405 are in fluid communication with one or more fluid distribution conduits 305, the openings 410 can be parallel and/or planar with one another. In one or more embodiments, the openings 410 can be parallel and planar with respect to one another and the internal volume 103 can be free or substantially free of any structures between the particulate inlet 111 and the openings 410. In one or more embodiments, the openings 410 can be parallel and planar with respect to one another and the internal volume 103 can be free or substantially free of any structures between the openings 410 and the top of a particulate bed that can be disposed within the internal volume 103.

The nozzles 405, the openings 410, or a combination thereof can include one or more screens, sintered filters, sintered laminate filters, rain caps, bubble caps, sieve caps, baffles, or other particulate-restricting devices 135 (see FIG. 1) that can reduce or prevent particulates from flowing from the internal volume 103 and into the nozzles 405.

Figure 5:
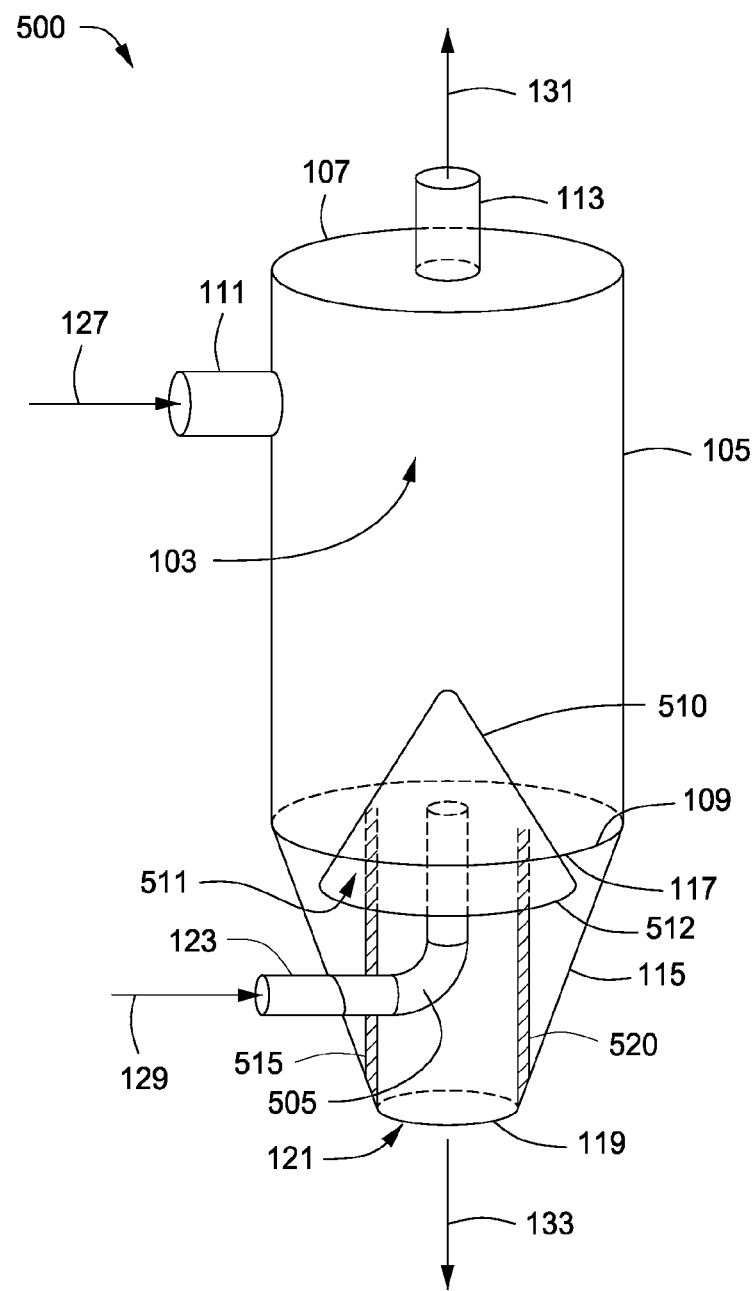
FIG. 5 depicts an isometric view of an illustrative separator having a fluid delivery cone disposed therein for introducing a fluid to the internal volume thereof.

FIG. 5 depicts an isometric view of an illustrative separator 500 having a fluid delivery cone 510 disposed therein for introducing a fluid to the internal volume 103 thereof. The separator 500 can be similar to the separators 100, 200, 300, and/or 400 discussed and described above with reference to FIGS. 1-4. The fluid delivery cone 510 can have an internal volume 511. One or more fluid distribution conduits 505 can be in fluid communication with one or more fluid inlets 123. An end of the fluid distribution conduits 505 can be located within the internal volume 511 of the fluid distribution cone 510. As such, the fluid via line 129 can be introduced to the internal volume of the fluid delivery cone 510. The fluid can flow from the fluid distribution conduits 505 into the internal volume 511 of the fluid delivery cone 510 and then into the internal volume 103 of the separator.

As depicted in FIG. 5, a base end 512 of the fluid delivery cone 510 can be oriented toward the bottom 119 of the separator 500. One or more support rods or beams (two are shown 515, 520) can support the fluid delivery cone 510. In another example, three or more support rods can be used. The one or more support rods 515, 520 can be connected to and extend between a sidewall of the internal volume 511 of the fluid delivery cone 510 and a sidewall of the particulate discharge section 115. An annulus can be formed between the base end 512 of the fluid delivery cone 510 and the inner walls of the particulate discharge section 115 and the annulus can be free of any structures.

The internal volume 103 can be free or substantially free of any structures disposed between the introduction of the particulates via line 127 through the particulate inlet 111 and the fluid via line 129 through from the internal volume 511 at the base 512 of the fluid delivery cone 510, but for the fluid delivery cone 510. For example, the internal volume 103 can be void of projections or protrusions extending from the walls and into the internal volume 103 between the particulate inlet 111 and the base 512 of the fluid delivery cone 510, other than the fluid delivery cone 510. In other words, the fluid delivery cone 510 can be supported by the support rods 515, 520 such that an annulus can be formed between the base 512 of the fluid delivery cone 510 and the side wall of the separator 500 that is free of any gas-conducting structures. In one or more embodiments, the internal volume 103 can be free or substantially free of any structures disposed between the base 512 of the fluid delivery cone 510, but for the fluid delivery cone 510, and a top of a particulate bed that can be disposed within the internal volume 103.

As depicted, the fluid delivery cone 510 can be located within both the separation section 105 and the particulate discharge section 115 of the separator 500. In one or more embodiments, the fluid delivery cone 510 can be completely located within the particulate discharge section 115. In one or more embodiments, the fluid delivery cone 510 can be completely located within the separation section 105.

Figure 6:
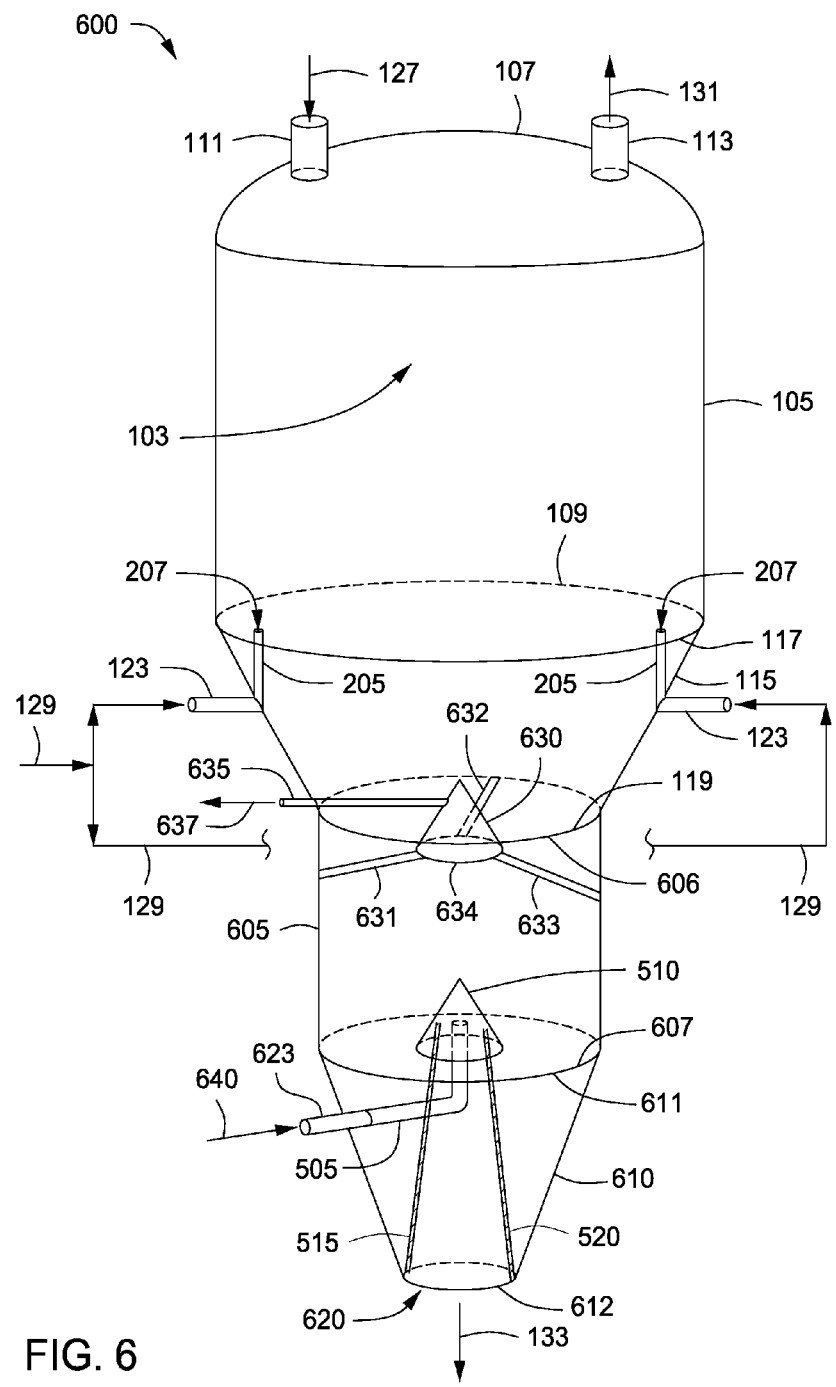
FIG. 6 depicts an isometric view of an illustrative separator having multiple levels of fluid introduction and fluid recovery.

FIG. 6 depicts an isometric view of another illustrative separator 600 having multiple levels of fluid introduction and fluid recovery. The separator 600 can include a first or separation section 105, a second section 115, third section or "deactivation section" 605, and fourth section or "particulate discharge section" 610. The second section 115 can also be referred to as a "transition" section since it can be located or transition between the separation section 105 and the deactivation section 605. The transition section 115 and the particulate discharge section 610 can be similar to the particulate discharge section 115 discussed and described above with reference to FIGS. 1-5. A first end or "top" 606 of the deactivation section 605 can be disposed on or otherwise connected to the bottom 119 of the transition section 115. A first end or "top" 611 of the particulate discharge section 610 can be disposed on or otherwise connected to a second end or "bottom" 607 of the deactivation section 605. A particulate outlet 620 can be disposed at or located toward a second end or "bottom" 612 of the particulate discharge section 610. The internal volume 103 of the separator 600 can include the volume bounded or formed by the separation section 105, transition section 115, deactivation section 605, and particulate discharge section 610.

The transition section 115 can include one or more fluid inlets 123. The fluid inlets 123 can be in fluid communication with one or more fluid distribution conduits 205, as discussed and described above with reference to FIG. 2. A fluid recovery cone 630 can be located or otherwise disposed within the deactivation section 605 and/or the transition section 115. As shown, the fluid recovery cone 630 can be supported by one or more support rods or beams (three are shown 631, 632, and 633). The support rods 631, 632, 633 can be connected to and extend from a base 634 of the fluid recovery cone 630 and an internal wall of the deactivation section 605. Fluid via line 637 from the internal volume 103 can be recovered via conduit 635 from the fluid recovery cone 630.

In at least one embodiment, the support rods 631, 632, 633 can be connected to an internal wall of the fluid recovery cone 630 and can extend toward the particulate discharge section 610. For example, the support rods 631, 632, 633 can extend from an inner wall of the fluid recovery cone 630 and be connected to an outer wall of the fluid distribution cone 510. In another embodiment, the support rods 631, 632, 633 can be connected to the fluid recovery cone 630 and a location on an inner wall of the deactivation section 605 located below the base 634 of the fluid recovery cone 630. In still another embodiment, the support rods 631, 632, 633 can be connected to the fluid recovery cone 630 and a location on an inner wall of the particulate discharge section 610.

One or more fluid distribution cones 510 can be disposed within the deactivation section 605, particulate discharge section 610, or within both the deactivation section 605 and particulate discharge section 610, similar as discussed and described above with reference to FIG. 5. A fluid via line 640 can be introduced through the one or more fluid inlets 623 to the one or more fluid distribution conduits 505. The fluid via conduit 505 can be introduced to the fluid delivery cone 510 located within the deactivation section 605 and/or the particulate discharge section 610 and can then be collected by the fluid recovery cone 630.

The cross-sectional shapes of the deactivation section 605 and the particulate discharge section 610 can be any suitable geometrical shape. The cross-sectional shapes of the deactivation section 605 and particulate discharge section 610 can be the same or different. Illustrative cross-sectional shapes can include, but are not limited to, circular, oval, elliptical, triangular, rectangular, any other polygon having three or more sides, any other shape having curved sides or any other geometrical shape having any combination of curved and straight sides.

The deactivation section 605 and/or the particulate discharge section 610 can have constant or variable cross-sections. For example, the cross-section of the deactivation section 605 can be circular having a constant diameter from the top 606 to the bottom 607 to provide a cylindrical deactivation section 605 and the cross-section of the particulate discharge section 610 can be circular having a variable diameter from the top 611 to a second end or "bottom" 612 to provide a conical or frustoconical particulate discharge section 610. In another example, the cross-section of the deactivation section 605 can be circular having a variable diameter from the top 606 to the bottom 607 to provide a conical or frustoconical deactivation section 605 and the cross-section of the particulate discharge section 610 can be circular having a variable diameter from the top 611 to the bottom 612 to provide two conical or frustoconical sections opposed to one another. In yet another embodiment, the cross section of the deactivation section 605 and the particulate discharge section 610 can both be circular with the deactivation section 605 and the particulate discharge section 610 having the same diameters or different diameters.

The angle or slope of a conical or frustoconical particulate discharge section 610 can range from about 50° to about 80° with respect to its bottom plane 612. For example, the angle or slope of a conical or frustoconical particulate discharge section 610 can be about 55°, about 60°, about 65°, about 68°, about 70°, about 72°, or about 75°, with respect to its bottom plane 612. Preferably, a conical or frustoconical particulate discharge section 610 has an angle of about 60°, more preferably about 65°, and even more preferably from about 68° to about 72°, with respect to its bottom plane 612.

The inner surface of the deactivation section 605, the particulate discharge section 610, or both can be coated with one or more slick or low friction coatings. Illustrative coating material can be or include, for example, polytetrafluoroethylene. Commercially available coating material can include PLASITE® 7122, which is available from CARBOLINE® Company.

The particulate outlet 620 can have any desired cross-sectional shape. For example, in at least one specific embodiment, the ratio of the cross-sectional area of the particulate outlet 620 to the cross-sectional area of the deactivation section 605 can be about 1:1, about 1:1.5, about 1:2, about 1:2.5, about 1:3, about 1:3.5, about 1:4, about 1:4.5, about 1:5, about 1:5.5, about 1:6, about 1:6.5, about 1:7, about 1:7.5, about 1:8, about 1:8.5, about 1:9, about 1:9.5, or about 1:10.

The dimensions of the separator 600, e.g. the separation section 105, transition section 115, deactivation section 605, particulate discharge section 610, inlets 111, 123, 623 and outlets 113, 620 and the number of inlets 111, 123, 623 and outlets 113, 131, 635 can be based, at least in part, on the particular components of the particulates, the rate of particulates introduced via line 127, and/or the amount of volatiles desired to be separated from the particulates. For example, the separator 600 can be constructed to provide an internal volume 103 capable of receiving from about 1 kg/hr to about 75,000 kg/hr or more of the particulates via line 127. In another example, the separator 100 can be constructed to provide an internal volume capable of receiving from a low of about 10 kg/hr, about 1,000 kg/hr, or about 10,000 kg/hr to a high of about 30,000 kg/hr, about 40,000 kg/hr, or about 50,000 kg/hr of the particulates via line 127.

The separator 600 can be made from any material or combination of materials having suitable rigidity, strength, and other desirable properties. Illustrative materials can include, but are not limited to, metals, metal alloys, polymers or plastics, glasses, fiberglass, or any combination thereof. Preferably the separator 600 is made from one or more metal or metal alloys such as steel, stainless steel, carbon steel, nickel alloys, and the like. Additional details for introducing suitable fluids to the separator via line 129 and 640, and other details for the separator 600 can be similar to those discussed and described in U.S. Pat. Nos. 4,758,654 and 6,022,946.

In one or more embodiments, the fluid distribution conduits 205 can be removed and the fluid via line 129 can be introduced through one or more openings 125, as discussed and described above with reference to FIG. 1. In one or more embodiments, the fluid distribution conduits 205 can be removed and the fluid via line 129 can be introduced through one or more fluid distribution conduits 305, as discussed and described above with reference to FIG. 3. In one or more embodiments, the fluid distribution conduits 205 can be removed and the fluid via line 129 can be introduced through one or more fluid distribution conduits 305 having nozzles 405 extending therefrom, as discussed and described above with reference to FIG. 4. In one or more embodiments, the fluid distribution conduits 205 can be removed and the fluid via line 129 can be introduced through one or more fluid distribution conduits 505 in fluid communication with an internal volume 511 of a fluid distribution cone 510, as discussed and described above with reference to FIG. 5. As such, the fluid via line 129 can be introduced to the separator 600 using any combination of fluid introduction devices, which can include one or more openings 125, one or more fluid distribution conduits 205, one or more fluid distribution conduits 305, one or more fluid distribution conduits 305 having one or more nozzles 405 extending therefrom, one or more fluid distribution cones 510, and combinations thereof.

In one or more embodiments, the fluid distribution cone 510 located within the deactivation section 605 and/or particulate discharge section 610 can be removed and the fluid via line 640 can be introduced through one or more openings 125, as discussed and described above with reference to FIG. 1. In one or more embodiments, the fluid distribution cone 510 located within the deactivation section 605 and/or particulate discharge section 610 can be removed and the fluid via line 640 can be introduced through one or more fluid distribution conduit 205 in fluid communication with the inlets 623, as discussed and described above with reference to FIG. 2. In one or more embodiments, the fluid distribution cone 510 located within the deactivation section 605 and/or particulate discharge section 610 can be removed and the fluid via line 640 can be introduced through one or more fluid distribution conduits 305, as discussed and described above with reference to FIG. 3. In one or more embodiments, the fluid distribution conduits 205 can be removed and the fluid via line 640 can be introduced through one or more fluid distribution conduits 305 having nozzles 405 extending therefrom, as discussed and described above with reference to FIG. 4. As such, the fluid via line 640 can be introduced to the separator 600 using any combination of fluid introduction devices, which can include one or more openings 125, one or more fluid distribution conduits 205, one or more fluid distribution conduits 305, one or more fluid distribution conduits 305 having one or more nozzles 405 extending therefrom, one or more fluid distribution cones 510, and combinations thereof.

In one or more embodiments, the fluid in line 640 can include any fluid or combination of fluids suitable for deactivating at least a portion of any active catalyst components in the particulates in line 127 to produce particulates via line 133 from the particulate outlet 620 having a reduced amount of active catalyst components relative to the particulates in line 127. In one or more embodiments, the fluid in line 640 can include any fluid or combination of fluids suitable for separating at least a portion of the volatiles in the particulates to produce particulates via line 133 from the particulate outlet 620 having a reduced concentration of volatiles relative to the particulates in line 127. In one or more embodiments, the fluid in line 640 can include any fluid or combination of fluids suitable for deactivating at least a portion of any active catalyst components in the particulates in line 127 and separating at least a portion of the volatiles in the particulates to produce particulates via particulate outlet 620 having both a reduced amount of active catalyst components and a reduced concentration of volatiles relative to the particulates in line 127.

Illustrative fluids in line 640 can include, but are not limited to, nitrogen, argon, carbon monoxide, carbon dioxide, water, hydrocarbons, or any combination thereof. Depending on the particular particulates, suitable fluids via line 640 can also be or include oxygen or air. In at least one embodiment, the fluid via line 640 can include about 90 vol % or more nitrogen, about 95 vol % or more nitrogen, about 98 vol % or more nitrogen, or about 99 vol % or more nitrogen. In at least one other embodiment, the fluid via line 640 can include a nitrogen/steam and/or water mixture. The amount of steam and/or water in the nitrogen/steam mixture can range from a low of about 0.001 vol %, about 0.01 vol %, or about 0.015 vol % to a high of about 1 vol %, about 3 vol %, or about 5 vol %. For example, the amount of steam in the nitrogen/steam and/or water mixture can range from about 0.5 vol % to about 2.5 vol %, about 1.2 vol % to about 1.6 vol %, or about 1 vol % to about 2 vol %.

The amount of volatiles separated and recovered via line 131 from the particulates introduced via line 127 can be about 90% or more, about 95% or more, about 99% or more, about 99.9% or more, about 99.95% or more, about 99.995% or more, or about 99.999% or more. In other words, the particulates recovered via line 133 can contain less than about 10%, less than about 5%, less than about 1%, less than about 0.1%, less than about 0.05%, less than about 0.005%, or less than about 0.001% of the volatiles present in the particulates.

In one or more embodiments, a fluid via line 640 containing water/steam, carbon dioxide, other deactivation mediums, or combinations thereof, can deactivate catalyst components that can be present in the particulates introduced via line 127. For example, Ziegler-Natta catalysts and/or organometallic catalyst residues can be present in the particulates in line 127 and the water/steam introduced via line 640 can have an effect on the hydrolysis of the catalyst(s) within the deactivation section 605 and/or particulate discharge section 610. The fluid introduced via line 123 to the separator 600 can separate a majority of the volatiles from the particulates introduced via line 127 within the separation and transition sections 105, 115; and the fluid introduced via line 640 can be primarily be used to deactivate active catalyst components in the particulates in line 127 within the deactivation section 605 and/or particulate discharge section 610.

The separator 600 can be operated at a temperature less than ambient temperature, equal to ambient temperature, or greater than ambient temperature. For example, if the particulates include one or more formed polymer particulates a desirable temperature can include a temperature ranging from about 20° C. to a temperature slightly below a melting point for the particular polymer particulates included in the particulates. In at least one embodiment, the separator 600 can be operated at a temperature ranging from a low of about 25° C., about 40° C., or about 60° C. to a high of about 90° C., about 110° C., or about 120° C. For example, the separator 600 can be operated at a temperature ranging from about 65° C. to about 95° C., about 70° C. to about 85° C., or about 55° C. to about 80° C.

The separator 600 can be operated at a pressure less than atmospheric pressure, equal to atmospheric pressure, or greater than atmospheric pressure. Preferably the separator 600 is operated at a positive pressure, i.e. greater than atmospheric pressure. For example, the separator 600 can be operated at a pressure ranging from a low of about 0.1 kPa, about 0.5 kPa, or about 1 kPa to a high of about 1,000 kPa, about 2,000 kPa, or about 3,000 kPa above atmospheric pressure. In at least one embodiment, the separator 100 can be operated at a pressure ranging from a low of about 50 Pa, about 150 Pa, or about 300 Pa to a high of about 700 Pa, about 1,000 Pa, or about 2,500 Pa above atmospheric pressure.

The particulates introduced via line 127 to the separator 600 can have any desired residence time within the separator 600. The residence time of the particulates within the separator 600 can range from a low of about 0.1 hours, about 0.3 hours, or about 0.4 hours to a high of about 1 hour, about 2 hours, about 3 hours, about 5 hours, or about 10 hours. For example, the particulates can have a residence time within the separator 600 ranging from about 0.5 hours to about 0.7 hours, from about 0.25 hours to about 0.9 hours, or from about 0.5 hours to about 1.5 hours.

The separators 100, 200, 300, 400, 500, and/or 600 can be used in a new facility or plant operation for separating volatile hydrocarbons from a polymer product, for example. In one or more embodiments, the separators 100, 200, 300, 400, 500, and/or 600 can be used to retrofit an existing separator in an already constructed and/or operating facility or plant. In one or more embodiments, fluid introduction inlets and/or devices of an existing separator can be removed and replaced with any one or combination of the fluid introduction devices discussed and described above with reference to FIGS. 1-6.

In one or more embodiments, the separators 100, 200, 300, 400, 500, and/or 600 can be operated in batch mode. For example, particulates can be introduced to the internal volume of the separator and the purge gas can be introduced thereto to remove at least a portion of any volatiles to provide particulates having a reduced concentration of volatiles relative to the particulates when introduced to the separator. The volatile-lean particulates can then be removed from the separator. In another example, particulates and purge gas can be continuously or semi-continuously introduced to the separator with particulates lean in volatiles relative to the particulates introduced thereto can be recovered continuously or semi-continuously from the separator. Depending upon the particular particulate feed and/or removal device used to introduce and recover the particulates to and from the separator; such devices can continuously introduce and recover particulates or can do so semi-continuously.

EXAMPLES

To provide a better understanding of the foregoing discussion, the following non-limiting examples are provided. Although the examples are directed to specific embodiments, they are not to be viewed as limiting the invention in any specific respect. All parts, proportions and percentages are by weight unless otherwise indicated.

Table 1 shows process conditions and results for three separators (Examples 1 and 2 and comparative example C1) that were used to separate 1-hexene (absorbate) from linear low density polyethylene particulates. Except for how the fluid via line 123 (see FIGS. 1-5 above) is introduced to the separators, the separators were identical. The separator used for all three examples was a carbon steel purge bin having a diameter of 20.3 cm. The bed height within the separator was maintained between about 0.74 and 0.81 meters. A 15.2 cm SIGCO® rotary airlock valve controlled the rate of particulate introduction to the separator. The rotary valve was rotated once each time the bed level dropped below the desired bed level, which transferred about 0.91 kg of the particulates. Below the conical bottom discharge section and in fluid communication with the particulate outlet 121 was a 10.2 cm SIGCO® rotary airlock valve driven by a variable-speed motor that continuously withdrew particulates from the separator. The separator included an electrical heater to maintain a constant temperature of about 68° C. to 70° C.

The separator in Example 1 was similar to the separator 100 and introduced the fluid via line 129 through an opening or port 125, according to embodiments discussed and described above with reference to FIG. 1. The opening 125 was flush with the inside surface of the wall of the separator. The separator in Example 2 was similar to the separator 500 and introduced the fluid via line 129 through a fluid delivery cone 510, according to embodiments discussed and described above with reference to FIG. 5. However, the base of the inverted cone was at the same plane as the bottom 109 of the separation section 105. Also, the support rods at the base of the cone were parallel with the base of the cone. The separator in comparative example C1 was similar to the separator 300 and fluid was introduced via line 129 through distribution conduits 305 having a plurality of openings or ports 310, according to embodiments discussed and described above with reference to FIG. 3. However, the plurality of openings 310 were directed toward the bottom 119 of the particulate discharge section 115 rather than the top 107 of the separation section 105. In other words, the distribution conduits 305 were located between the introduction of the fluid through the openings 310 and the top of the particulate bed and acted as a channeling structure. The internal volumes 103 of the separators were free of any structures between the particulate inlet 111 and the point or location at which the fluid via line 129 was introduced to the internal volume 103.

For Examples 1-3, granular polyethylene particulates were charged to a Day mixer, the absorbate (1-hexene) was added, and the 1-hexene/polyethylene mixture was heated to the desired temperature prior to introduction to the separator. In order to maintain a constant concentration of 1-hexene in the mixture, 1-hexene was added to maintain the vapor space in the Day mixer at a constant concentration. A Total Hydrocarbon Analyzer was used to confirm the desired 1-hexene concentration in a nitrogen feed introduced to the Day mixer. The concentration of 1-hexene in the particulates recovered from the separator was determined using Head Space Gas Chromatography. The purge gas was nitrogen and the flow rate was maintained between 0.454 kg/hr and 0.485 kg/hr.

TABLE 1

| | Example | | |
|---|---|---|---|
| | EX. 1 | EX. 2 | C1 |
| Fluid via line 127 introduced through | A Single Opening/Port | Inverted Cone Supported with Horizontal Support Rods | Fluid Distribution Conduits |
| Polymer | Polyethylene | Polyethylene | Polyethylene |
| Polymer Density (g/cm$^3$) | 0.918 | 0.918 | 0.918 |
| Melt Index (I2) (g/10 min) | 1.0 | 1.0 | 1.0 |
| Average Particle Size (mm) | 0.62 | 0.62 | 0.63 |
| Bulk Density (kg/cm$^3$) | 386 | 392 | 397 |
| Absorbate | 1-hexene | 1-hexene | 1-hexene |
| Henry's law constant for 1-hexene in the polymer, atm Conditions | 16.9 | 17.3 | 17.7 |
| Temperature (° C.) | 68 | 69 | 70 |
| Pressure (kPag) | 0.69 | 0.69 | 0.69 |
| Polymer Flow Rate (kg/hr) | 15.7 | 15.7 | 16.7 |
| Purge Gas (N$_2$) Flow Rate (kg/hr) | 0.45 | 0.48 | 0.49 |
| Bed Height Above Purge Gas Injection (m) | 0.81 | 0.74 | 0.74 |
| Internal Cone | No | Yes | No |
| Slope of Frustoconical Particulate Discharge Section 115, with Respect to Horizontal | 70° | 70° | 70° |
| Residence Time (hr) | 0.66 | 0.6 | 0.56 |
| Dimensionless solid/gas flow ratio (γ) | 0.68 | 0.64 | 0.65 |
| 1-hexene Concentration in Particulate Mixture via Line 127 (ppmw) | 7,200 | 6,500 | 5,500 |

TABLE 1-continued

| | Example | | |
|---|---|---|---|
| | EX. 1 | EX. 2 | C1 |
| 1-hexene Concentration in Particulates Recovered via Line 133 (ppmw) | 2.6 | 6.6 | 15.1 |

Other than the means used for introducing the purge gas to the separators in Examples 1 and 2 and comparative example C1, the process conditions were relatively uniform. The dimensionless ratio of solid particulates to gas flow rates (γ) had a narrow range of 0.64 to 0.68 for the examples. This ratio can be expressed as (Polyethylene Mass Flow Rate*Pressure*MW($N_2$))/($N_2$ Mass Flow Rate*Hydrogen*MW(1-hexene), where H is the Henry's law constant for 1-hexene in the polyethylene, and MW is the molecular weight of the polymer. The MI ($I_2$) value for all examples is 1 and is measured in accordance with ASTM D-1238-E (at 190° C., 2.16 kg weight). The dimensionless solid/gas flow ratio (γ) for Examples 1-3 ranged from 0.64 to 0.68. The residence time of the polymer particulates in the separators ranged from 0.56 to 0.66 hours.

In each of the examples, the concentration of 1-hexene in the polymer particulates was reduced by more than two orders of magnitude. However, in Examples 1 and 2, the reduction in 1-hexene concentration following purging of the polyethylene particulates amounted to three orders of magnitude and more. It was expected that the fluid distribution conduits used in the comparative example 1 would yield the best results. However, a simple opening introducing the purge gas to the separator was the most effective of the three examples. It was surprising and unexpected that Example 1, which introduces the nitrogen purge gas through a single port to the separator, yielded the most effective separation. The concentration of 1-hexene for Example 1 was 7,200 ppmw in the polyethylene. The polyethylene recovered from the separator had a concentration of 1-hexene of only 2.6 ppmw. In other words, the crudest means of introducing the nitrogen purge gas to the separator was the most effective. Distribution of purge gas through multiple holes in the three fluid distribution conduits directed toward the bottom 119 of the particulate discharge section provided the least effective purging.

All numerical values are "about" or "approximately" the indicated value, and take into account experimental error and variations that would be expected by a person having ordinary skill in the art.

All documents cited in this application are fully incorporated by reference to the extent such disclosure is not inconsistent with this application and for all jurisdictions in which such incorporation is permitted.

Various terms have been defined above. To the extent a term used in a claim is not defined above, it should be given the broadest definition persons in the pertinent art have given that term as reflected in at least one printed publication or issued patent. While the foregoing is directed to embodiments of the present invention, other and further embodiments of the invention can be devised without departing from the basic scope thereof, and the scope thereof is determined by the claims that follow.

What is claimed is:

1. An apparatus for separating volatiles from particulates, comprising:
   a separator having an internal volume, wherein the separator further comprises a separation section having a cylindrical inner wall disposed toward the first end of the separator and a particulate discharge section having a frustoconical inner wall disposed toward the second end of the separator, wherein the frustoconical inner wall has an angle ranging from about 50° to about 80° with respect to a base of the frustoconical inner wall;
   a fluid discharge outlet, a particulate discharge outlet, a particulate inlet, and a fluid inlet in fluid communication with the internal volume, wherein the particulate inlet is disposed toward a first end of the separator, and wherein the fluid inlet is disposed toward a second end of the separator, and wherein the fluid inlet comprises one opening disposed through a sidewall of the separator; and
   a fluid introduction cone disposed within the internal volume and located toward the second end of the separator, wherein a base of the fluid introduction cone is oriented toward the second end of the separator, wherein the fluid introduction cone is supported by one or more support members extending from an internal wall of the fluid introduction cone to a sidewall of the particulate discharge section of the separator such that an annulus is formed between the base of the fluid introduction cone and the separator that is free of any structures, and wherein a conduit fluidly connects the fluid inlet with an internal volume of the fluid introduction cone.

2. The apparatus of claim 1, wherein at least one of the cylindrical inner wall and the frustoconical inner wall is coated with a low-friction coating.

3. The apparatus of claim 1, wherein the frustoconical inner wall has an angle ranging from about 60° to about 75° with respect to a base of the frustoconical inner wall.

4. The apparatus of claim 1, wherein the fluid inlet further comprises a particulate-restricting device disposed within or about the opening.

5. The apparatus of claim 1, wherein the internal volume is substantially free of any gas-conducting structures between the opening and a top of a particulate bed disposed therein.

6. The apparatus of claim 1, wherein the apparatus further comprises a separation section and a second section, wherein the fluid introduction cone is disposed within a portion of the separation section and a portion of the second section.

7. The apparatus of claim 1, wherein the apparatus further comprises a separation section and a second section, wherein the fluid introduction cone is disposed within the second section.

8. A method for separating volatiles from particulates using the apparatus of claim 1, comprising:
   introducing particulates containing volatiles to the internal volume of the separator through the particulate inlet; and
   introducing a purge gas to the internal volume through the fluid inlet, wherein the purge gas counter-currently contacts the particulates to produce a volatiles-rich purge gas and particulates having a reduced concentration of volatiles;
   recovering the volatiles-rich purge gas from the fluid discharge outlet; and
   recovering the particulates from the particulate discharge outlet.

9. The method of claim 8, wherein introducing the purge gas through the fluid inlet further comprises flowing the purge gas through a nozzle disposed within the internal volume and coupled to the opening such that a distal end of the conduit is directed toward the first end of the separator.

10. The method of claim 8, wherein introducing the purge gas through the fluid inlet further comprises flowing the purge gas through one fluid distribution conduit perpendicularly disposed within the internal volume relative to a longitudinal axis of the separator, wherein the purge gas flows into the internal volume through one opening disposed through a sidewall of the fluid distribution conduit, and wherein the opening is directed toward the first end of the separator.

* * * * *